(No Model.)

R. W. HARDIE.
DISK HARROW.

No. 473,115. Patented Apr. 19, 1892.

WITNESSES:
Marion Randolph
Walter Nelius

INVENTOR,
Robert W. Hardie.

UNITED STATES PATENT OFFICE.

ROBERT W. HARDIE, OF ALBANY, NEW YORK.

DISK HARROW.

SPECIFICATION forming part of Letters Patent No. 473,115, dated April 19, 1892.

Application filed December 11, 1891. Serial No. 414,757. (No model.)

*To all whom it may concern:*

Be it known that I, ROBERT W. HARDIE, a citizen of the United States, residing at Albany, in the county of Albany and State of New York, have invented certain new and useful Improvements in Disk Harrows; and I do hereby declare the following to be a full, clear, and exact description of the invention, such as will enable others skilled in the art to which it appertains to make and use the same.

My invention has for its objects, first, to provide means for resisting the side pressure of the disk gangs when arranged obliquely to the line of draft; second, to construct scrapers adapted to conform to the inequalities of the disks and recede from the disks when not in use. These objects I accomplish by the means illustrated in the accompanying drawings, in which—

Figure 1:
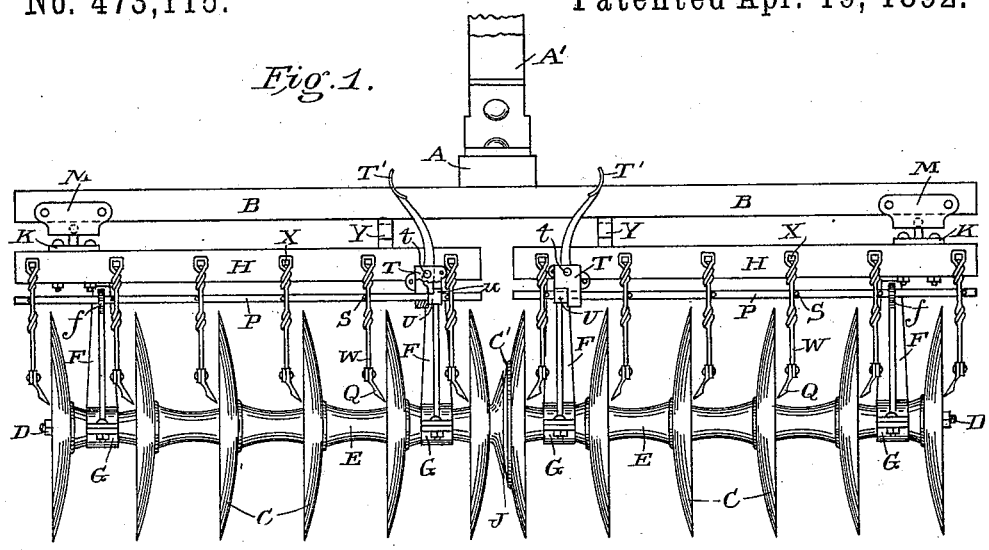
Figure 5:
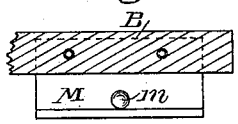
Figure 6:
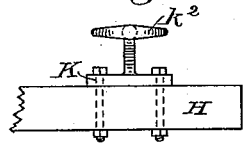
Figure 2:
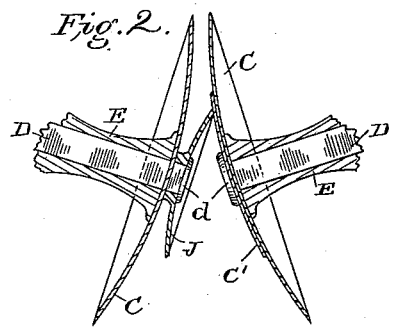
Figure 10:
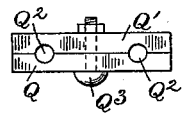
Figure 9:
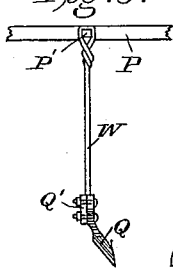
Figures 7, 8:
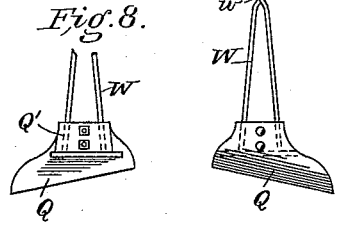
Figure 3:
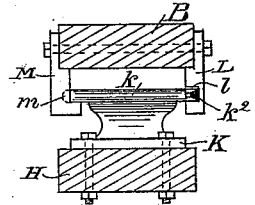
Figure 4:
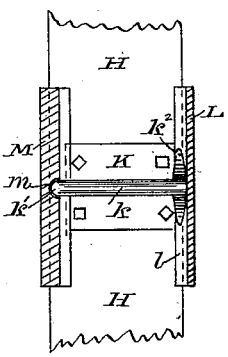

Figure 1 is a rear view of a disk harrow embodying my invention. Fig. 2 is a horizontal cross-section of the inner ends of the disk gangs arranged obliquely to the line of draft. Fig. 3 is an end view of cross-bar and gang-bar and a side view of a hinge-joint. Fig. 4 is a plan view of hinge-pin and horizontal section of hinge-plates. Fig. 5 is a front view of the rear hinge-plate attached to cross-bar. Fig. 6 is a front view of hinge-pin attached to gang-bar. Fig. 7 is a view of one side of scraper blade and shank and a transverse section of gang-bar and scraper-bar. Fig. 8 is a view of the opposite side of blade shown in Fig. 9 and lower end of shank. Fig. 9 is a rear view of modification of scraper. Fig. 10 is a plan view of upper end of scraper-blade.

As illustrated in the drawings, the main frame and disk gangs of the harrow are of ordinary construction. The main frame consists of a pole A and cross-bar B, extending laterally from the pole. A seat-standard A' may be secured to the pole, if desired. Each disk gang consists of a series of disks C, mounted on an axle-rod D and separated from each other by spools E. Standards F, connected at their upper ends to the gang-bar H and provided with bearing-boxes G on their lower ends, also form part of the disk gangs. The gangs are secured to the main frame by a hinge-joint having a horizontal hinge-pin $k$ formed on a base K, which is secured to the gang-beam H. The rear end $k'$ of said pin is pivoted in a socket $m$, formed in the rear hinge-plate M. The forward end of said pin is provided with a sector-edge $k^2$, which engages the groove $l$, formed in the front hinge-plate L. The upper and lower surfaces of the sector end of the hinge-pin are made convex, so that the ends of the pin may be free to rock in their bearings and thereby enable the gangs to move vertically. The gangs move horizontally on the pivot formed by the rear end $k'$ of the hinge-pin, the forward or free end $k^2$ of the pin at the same time moving laterally in the groove $l$.

The disk gangs are provided with scrapers, each of which consists of a scraping-blade Q, mounted on the lower end of a shank W. This shank is made of resilient metal, and is preferably formed of a single wire doubled on itself midway of its length to form a loop at the upper end of the shank, below which another loop is formed adapted to receive a reciprocating bar P. The wire strands forming the scraper shank are crossed at a point $w$ below the bar P to enable the lower end of the shank to have a torsional movement at that point. The strands are separated from the point $w$ downward to form a strong and steady support for the scraping-blade W. The ends of the bar P are supported in bearings, the inner one of which is formed on the lower end of the bracket T, attached to the gang-bar H and the outer one on a rear extension $f$ of the upper end of the standard F. Pins or studs S are secured to the bar P and bear against the back of the scraper-shanks. A lever T' is pivoted to the bracket T at $t$, and its lower end engages a lug $u$, formed on the collar U, which is secured to the scraper-bar P. When the lever T' is depressed by the operator, the scraper-bar P is drawn inward by the lower end of said lever and the scraper-shanks are inclined toward the faces of the disks. The shanks, being made of resilient metal, enable the scraping-blades to press inward or recede to compensate for any irregularity in the disks, and the shanks W being free to twist at the point $w$ the blades adjust themselves to any irregularities in the disks, either near the axle or outer edge. When the pressure is moved from the lever T', the scraper-shanks spring backward to their normal position away from the disks, as shown in the drawings.

The upper ends of the scraper-shanks may be secured to the scraper-bar P instead of to the gang-beam H, if desired, as shown in Fig. 9.

A contact-plate J, smaller in diameter than the cutting-disks C, is secured to the inner end of one gang, and when the gangs are arranged obliquely to the line of draft its edge bears against the inner disk of the opposing gang at a point between the axle and the forward cutting-edge of the disk.

A reinforcing-plate C' may, if desired, be secured to the inner disk of the opposing gang. In the construction herein shown said plate is arranged on the outer or convex side of the disk. It may, however, be placed against the inside of the disk, if desired.

When the parts are constructed in the manner shown and described, the side pressure of the earth is resisted at a point well forward of the axle, instead of making contact between the gangs at their axles, as has heretofore been done, and the side pressure of the gangs extends in a direct line nearly at right angles to the line of draft, and the cutting-edges of the disks are thereby caused to bear against the uncut portions of the earth or landside and sustain a considerable portion of the side pressure, whereas when contact is made between the gangs at the axles the line of pressure extends diagonally backward and the forward cutting-edges of the disks are not pressed laterally against the uncut earth and said portions of the earth do not aid in resisting the side pressure of the gangs. The forward cutting-edges of the inner disks of the gangs can with this construction be brought as close together as desired without making contact at their edges or subjecting said edges to extra wear. The contact-plate J also aids in cutting down and cultivating the ridge of earth usually left between the inner disks of the gangs.

In the construction shown herein the bearing-surface of the contact-plate consists of the outer edge of the plate extending in an unbroken circular line, and the plate itself is constructed in one integral piece. I do not desire to be limited to such construction, however, although for most purposes I prefer it.

What I claim is—

1. In a disk harrow, the combination of two opposing disk gangs, and a contact-plate secured to the inner end of one gang and provided with a bearing-surface arranged in a circle concentric with the inner disk of said gang between the axle and cutting-edge of said disk and adapted to bear against the inner disk of the opposing gang between the axle and cutting-edge of said opposing disk when arranged obliquely to the line of draft, substantially as shown and described.

2. In a disk harrow, the combination of a cutting-disk and a scraper having a shank composed of resilient strands crossed to form a bending or twisting point and separated at their lower ends, which are provided with a scraping-blade, substantially as shown and described.

In testimony whereof I affix my signature in presence of two witnesses.

ROBERT W. HARDIE.

Witnesses:
  CHAS. H. MILLS,
  CHARLES F. BRIDGE.